US012509323B2

(12) United States Patent
Marpu

(10) Patent No.: US 12,509,323 B2
(45) Date of Patent: Dec. 30, 2025

(54) AUTOMATICALLY SUPPORTING SOCIAL DISTANCING FOR ELEVATOR CALL REQUESTS AND IDENTIFICATION OF WAITING PASSENGERS USING DEEP LEARNING AND MACHINE LEARNING

(71) Applicant: Otis Elevator Company, Farmington, CT (US)

(72) Inventor: Appalaraju Marpu, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1408 days.

(21) Appl. No.: 17/130,327

(22) Filed: Dec. 22, 2020

(65) Prior Publication Data

US 2022/0194736 A1    Jun. 23, 2022

(51) Int. Cl.
| | | |
|---|---|---|
| B66B 1/24 | (2006.01) | |
| B66B 1/28 | (2006.01) | |
| G06N 3/08 | (2023.01) | |
| G06V 20/13 | (2022.01) | |
| B66B 1/34 | (2006.01) | |

(52) U.S. Cl.
CPC .............. B66B 1/2408 (2013.01); B66B 1/28 (2013.01); G06N 3/08 (2013.01); G06V 20/13 (2022.01); B66B 1/3476 (2013.01); B66B 2201/215 (2013.01); B66B 2201/222 (2013.01); B66B 2201/223 (2013.01)

(58) Field of Classification Search
CPC ....... B66B 1/2408; B66B 1/28; B66B 1/3476; B66B 2201/215; B66B 2201/222; B66B 2201/223; G06N 3/08; G06V 20/13
See application file for complete search history.

(56) References Cited

U.S. PATENT DOCUMENTS 10,259,683 B2 *   4/2019  Yamada ................. G05B 17/02
2017/0291792 A1 * 10/2017 Scoville ................ B66B 1/3407

FOREIGN PATENT DOCUMENTS

| CN | 110342357 A | * | 10/2019 | ........... B66B 1/3476 |
|---|---|---|---|---|
| CN | 111377314 A | | 7/2020 | |
| CN | 111792467 A | | 10/2020 | |
| DE | 102013209368 A1 | * | 11/2014 | ........... B66B 1/2408 |

(Continued)

OTHER PUBLICATIONS

Chinese Office Action for Application No. 202110953103.X, Issued Mar. 6, 2024, 6 Pages.

(Continued)

*Primary Examiner* — Ryan J. Walters
(74) *Attorney, Agent, or Firm* — CANTOR COLBURN LLP

(57) ABSTRACT

Provided are embodiments for identifying waiting passengers outside an elevator using deep learning and machine learning and automatically supporting social distancing for elevator passengers. Embodiments include receiving a call request from an elevator floor; capturing an image of the elevator floor registering the call request responsive to receiving the call request; and determining, from the image, a presence of one or more waiting passengers on the elevator floor registering the call request. Embodiments also include dispatching an elevator car to the elevator floor registering the call request; and controlling the elevator car based at least in part on determining the presence of the one or more waiting passengers.

20 Claims, 5 Drawing Sheets

(56) References Cited

FOREIGN PATENT DOCUMENTS

| | | |
|---|---|---|
| EP | 3228569 A1 | 10/2017 |
| EP | 3677532 A1 | 7/2020 |
| JP | 2016088647 A | 5/2016 |

OTHER PUBLICATIONS

European Search Report for Application No. 21210001.0, Issued Apr. 11, 2022, 10 Pages.

* cited by examiner

AUTOMATICALLY SUPPORTING SOCIAL DISTANCING FOR ELEVATOR CALL REQUESTS AND IDENTIFICATION OF WAITING PASSENGERS USING DEEP LEARNING AND MACHINE LEARNING

BACKGROUND

The embodiments herein relate to elevator systems, and more particularly to identification of waiting passengers outside an elevator using deep learning and machine learning and automatically supporting social distancing for elevator passengers.

In today's environment, travel for business and personal reasons are very common, and the travelers can encounter many others in a short period of time. Because travelers can easily travel to limitless destinations, if an individual has a communicable health condition such as a virus or infection, several other individuals may become exposed. The risk of unknowingly spreading the virus or infection can be undesirably increased. There may be a need to encourage social distancing among travelers.

BRIEF SUMMARY

According to an embodiment, a method for identifying waiting passengers outside an elevator using deep learning and machine learning and automatically supporting social distancing for elevator passengers is shown. The method includes receiving, at an elevator controller, a call request from an elevator floor; responsive to receiving the call request, capturing an image of the elevator floor registering the call request; and determining, from the image, a presence of one or more waiting passengers on the elevator floor registering the call request. The method also includes dispatching an elevator car to the elevator floor registering the call request; and controlling the elevator car based at least in part on determining the presence of the one or more waiting passengers.

In addition to one or more of the features described herein, or as an alternative, further embodiments include determining the presence of one or more waiting passengers, counting a number of the one or more waiting passengers in the image; predicting a number of elevator cars needed to service the one or more waiting passengers based at least in part on the number of one or more waiting passengers; dispatching the number of elevator cars to the elevator floor registering the call request based at least in part on the number of the one or more waiting passengers; and stopping the elevator cars on the elevator floor registering the call request based at least in part on the number of waiting passengers.

In addition to one or more of the features described herein, or as an alternative, further embodiments include performing a subsequent image capture of the elevator floor registering the call request after dispatching the one or more elevators cars, modifying the number of elevator cars that have been dispatched based at least in part on the subsequent image capture.

In addition to one or more of the features described herein, or as an alternative, further embodiments include performing a subsequent image capture to determine the presence of the one or more waiting passengers.

In addition to one or more of the features described herein, or as an alternative, further embodiments include ignoring the call request if no passengers are detected on the elevator floor registering the call request.

In addition to one or more of the features described herein, or as an alternative, further embodiments include receiving a new hall call request prior to the elevator car departing the elevator floor registering the new hall request; determining remaining capacity inside the elevator car responsive to receiving the new hall call request; ignoring the new hall call request based at least in part on the remaining capacity inside the elevator car, otherwise, re-opening elevator car doors to allow one or more waiting passengers to board the elevator car.

In addition to one or more of the features described herein, or as an alternative, further embodiments include using a subsequent image that is captured after the elevator car begins traveling towards the elevator floor registering the call request.

In addition to one or more of the features described herein, or as an alternative, further embodiments include using an image that is analyzed when the elevator car is a threshold distance away from the elevator floor registering the call request.

In addition to one or more of the features described herein, or as an alternative, further embodiments include determining the presence of one or more passengers based on performing machine learning on the image to individually identify the one or more passengers.

According to an embodiment, a system for identifying of waiting passengers outside an elevator using deep learning and machine learning and automatically supporting social distancing for elevator passengers is shown. The system includes an elevator car and elevator controller; one or more sensors operably coupled to the elevator car and the elevator controller, wherein the one or more sensors are adapted to capture an image of an elevator floor registering a call request. The elevator controller is configured to receive a call request from an elevator floor; responsive to receiving the call request, capture an image of the elevator floor registering the call request; determine a presence of one or more waiting passengers on the elevator floor registering the call request. The elevator controller is further configured to dispatch an elevator car to the elevator floor registering the call request; and control the elevator car on the elevator floor based at least in part on determining the presence of the one or more waiting passengers.

In addition to one or more of the features described herein, or as an alternative, further embodiments include a camera located inside the elevator car that is positioned to capture an image of boarded passengers.

In addition to one or more of the features described herein, or as an alternative, further embodiments include an elevator controller configured to count a number of the one or more waiting passengers in the image; predict a number of elevator cars needed to service the one or more waiting passengers based at least in part on the number of one or more waiting passengers; dispatch the number of elevator cars to the elevator floor registering the call request based at least in part on the number of the one or more waiting passengers; and control the elevator cars on the elevator floor registering the call request based at least in part on the number of one or more waiting passengers.

In addition to one or more of the features described herein, or as an alternative, further embodiments include an elevator controller that is configured to perform a subsequent image capture of the elevator floor registering the call request after dispatching the one or more elevators cars; and modify the number of elevator cars that have been dispatched based at least in part on the subsequent image capture.

In addition to one or more of the features described herein, or as an alternative, further embodiments include performing a subsequent image capture to determine the presence of the one or more waiting passengers.

In addition to one or more of the features described herein, or as an alternative, further embodiments include an elevator controller that is further configured to ignore the call request if no passengers are detected on the elevator floor registering the call request.

In addition to one or more of the features described herein, or as an alternative, further embodiments include using an image that is analyzed responsive to receiving the call request registering the elevator floor.

In addition to one or more of the features described herein, or as an alternative, further embodiments include using a subsequent image that is captured after the elevator car begins traveling towards the elevator floor registering the call request.

In addition to one or more of the features described herein, or as an alternative, further embodiments include using an image that is analyzed when the elevator car is a threshold distance away from the elevator floor registering the call request.

In addition to one or more of the features described herein, or as an alternative, further embodiments include determining the presence of one or more passengers that is based on performing machine learning on the image to individually identify the one or more passengers.

In addition to one or more of the features described herein, or as an alternative, further embodiments include an image capturing device on each elevator floor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Oftentimes, elevator cars arrive at elevator floors where no passengers are waiting to board. The passengers may leave the elevator floor for a variety of reasons. For example, the passengers may return to their office or a nearby parking deck to retrieve a forgotten item. In another example, the passengers may board another elevator car that has reached their elevator floor prior to the intended elevator car has arrived.

This can lead to unnecessarily stopping the elevator if no passenger(s) is waiting which can result in a delay in servicing other passengers on other floors. Also, unnecessarily running elevators consumes substantial power and can lead to increased maintenance service and costs.

In a different scenario, as passengers on a crowded elevator floor enter an elevator car, the other passengers that were not able to enter the elevator car may press the hall call button preventing the elevator car from closing its doors and transporting the passengers to continue its destination. This can lead to unnecessary delays in servicing the passengers.

Conventional techniques may rely on motion detectors to determine a presence of an individual. However, the accuracy of the motion detectors is limited and may register false positives and false negatives results. In addition, motion detectors simply identify motion of objects and cannot distinguish between the motion of a moving person or some other moving object.

The techniques described herein improve over the conventional systems by implementing machine learning and deep learning algorithms for processing of images to accurately identify individual people that are present in the image. The information can be used to determining whether to continue servicing the call request or determining the call request is no longer needed. In addition, the information can be used to determine if additional elevator cars may be required to service the number of waiting passengers on the elevator floor that registered the call request. The techniques described herein can improve the passenger experience by reducing the delay prior to the elevator arrival and optimize the elevator power consumption and usage.

Figure 1:
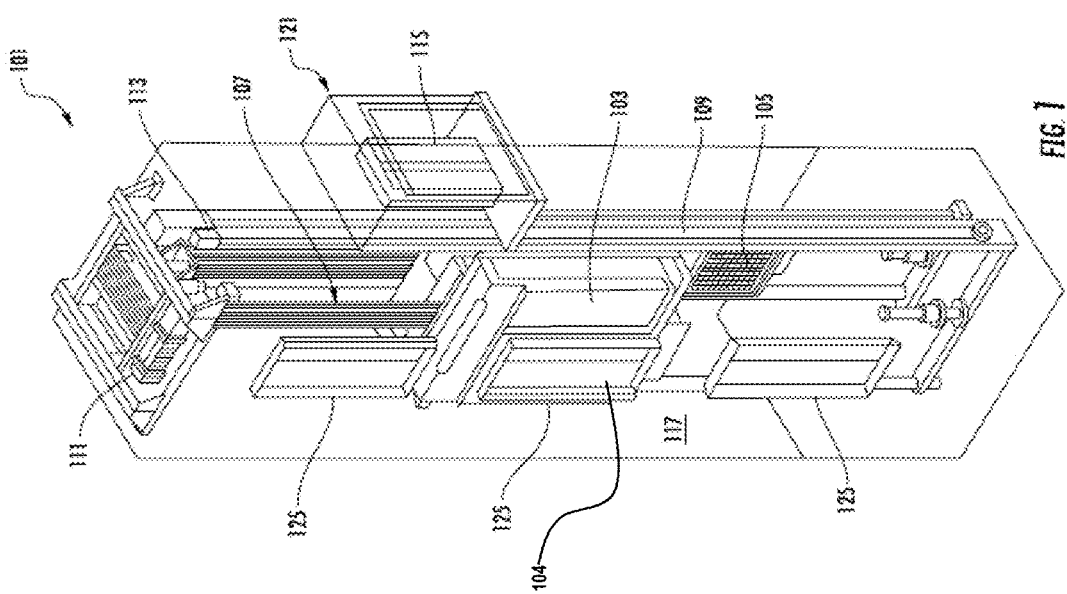
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self propelled elevator cars (e.g., friction wheels or beam climbers). FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
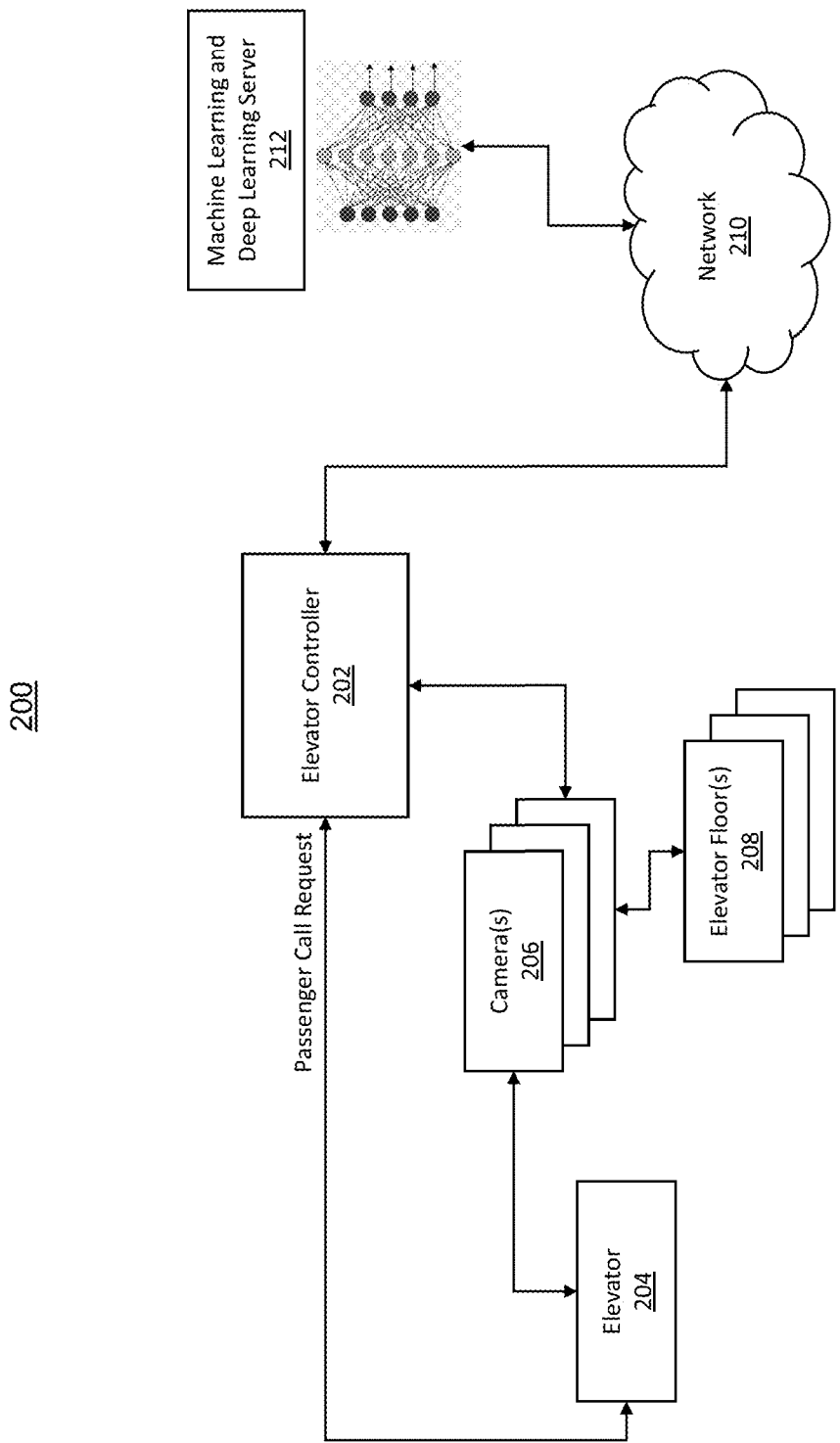
FIG. 2 depicts a block diagram of a system identifying waiting passengers on an elevator floor and dispatching one or more elevator cars based on identifying the number of waiting passengers in accordance with one or more embodiments.

FIG. 2 depicts a system 200 for identifying waiting passengers in accordance with one or more embodiments. The system 200 can include an elevator controller 202 similar to the elevator controller 115 shown in FIG. 1. The elevator controller 202 is operably coupled to one or more elevator cars 204 that service various floors of a building. In one or more embodiments, each elevator floor 208 can include an image capture device such as a camera 206 that is operated and positioned to take an image of the waiting passengers on each elevator floor 208. The image capture device can include other types of sensors that are configured to collect image data to identify the presence of the waiting passengers on the elevator floor 208.

The image capture device can be triggered to capture image data using various techniques. For example, the image capture device can receive a signal from the elevator controller 202 responsive to receiving a call request. In another example, the image capture device can be triggered to take an image responsive to closing the elevator doors, or in a different example, the image capture device can be triggered to take an image of the elevator floor 208 as the elevator car 204 is traveling towards the elevator floor 208 that registered the call request.

As shown in FIG. 2, the system 200 includes a server 212 that is operably coupled to the elevator controller 202 over a network 210. The elevator controller 202 can transmit the image data that has been captured by the camera(s) 206 to the server 212 for processing. In one or more embodiments, the server 212 includes machine learning modules (ML) and deep learning (DL) modules to analyze the captured images and compare them to the training data for identifying and counting the waiting passengers. Overtime, the machine learning modules and deep learning modules improve its accuracy in identifying the individual passengers and distinguishing them from other objects that may be present on the elevator floor 208.

In one or more embodiments, the elevator controller 202 can be configured with a waiting passenger threshold to determine how many elevator cars 204 should be dispatched to the elevator floor 208 registering the call request to service the waiting passengers which is further discussed with reference to FIG. 4.

Because the proximity between the time when the image analysis is performed to the time the call request is registered is of consequence, the image analysis can be executed as the elevator car 204 approaches the elevator floor 208 that registered the call request or when the elevator car is a threshold distance away from the elevator floor 208. For example, the image capture and analysis can be performed when the elevator car 204 is a threshold distance away, such as 3 floors, 5 floors, n floors away.

In the event that no passengers are detected on the elevator floor 208, the elevator controller 202 can provide a signal to the elevator car 204 to keep moving towards another elevator floor 208 to service another call request. That is, if no passenger is waiting the elevator car 204 can continue on without stopping on the elevator floor 208 that registered the call request and ignore the call request. Alternatively, if one or more passengers are found to be waiting on the elevator floor 208, the elevator car 204 will stop on the elevator floor 208 and service the call request.

Figure 3:
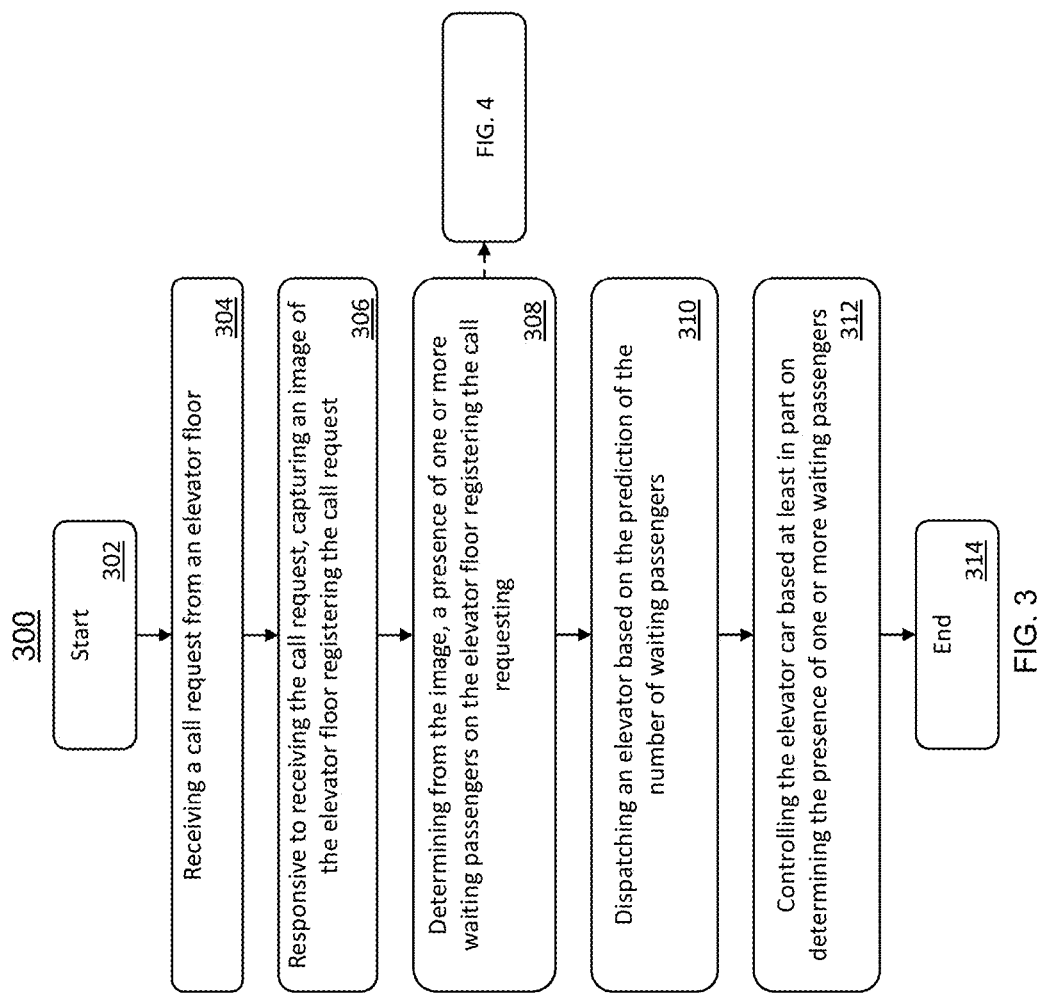
FIG. 3 depicts a flowchart of a method for identifying waiting passengers on an elevator floor in accordance with one or more embodiments.

With reference now to FIG. 3 depicts a flowchart of a method 300 for identifying waiting passengers in accordance with one or more embodiments. The method 300 begins at block 302 and proceeds to block 304 which provides for receiving, at an elevator controller 202, a call request from an elevator floor. Block 306 responsive to receiving the call request, capturing an image of the elevator floor 208 registering the call request. In one or more embodiments, the image is captured by a camera 206 or other image capturing device, and the image data is transmitted to the server 212 or other processor for further analysis.

At block 308, the server 212 determines from the image, a presence of one or more waiting passengers on the elevator floor 208 registering the call request. In one or more embodiments, the image data is transmitted to a processor or server 212 that includes machine learning modules and deep learning modules to identify the waiting passengers from the image data. Block 310 dispatches, using an elevator controller 202, an elevator car 204 to the elevator floor 208 registering the call request. In one or more embodiments, the elevator controller 202 can dispatch one or more elevators cars 204 as needed.

Block 312 controls the elevator car 204 based at least in part on determining the presence of the one or more waiting passengers on the elevator floor 208. In the event no users are identified in the image that is processed by the server 212 using the machine learning and deep learning algorithms, the elevator car 204 is can be controlled by ignoring or eliminating the call request for the elevator floor 208 that registered the call request. The elevator car 204 will not stop on the elevator floor 208. Controlling, by the elevator controller 202, the elevator car 204 can include reducing the number of elevator cars 204 dispatched to the elevator floor 208 if the number of waiting passengers has been reduced or is less than a waiting passenger threshold. Alternatively, if the machine learning and deep learning algorithms indicate the number of waiting passengers has increased on the elevator floor 208 that registered the call request, additional elevator cars 204 can be dispatched to the elevator floor 208 registering the call request. The method 300 ends at block 314. It should be understood that additional steps or a different sequence of steps can be incorporated into the method 300.

Figure 4:
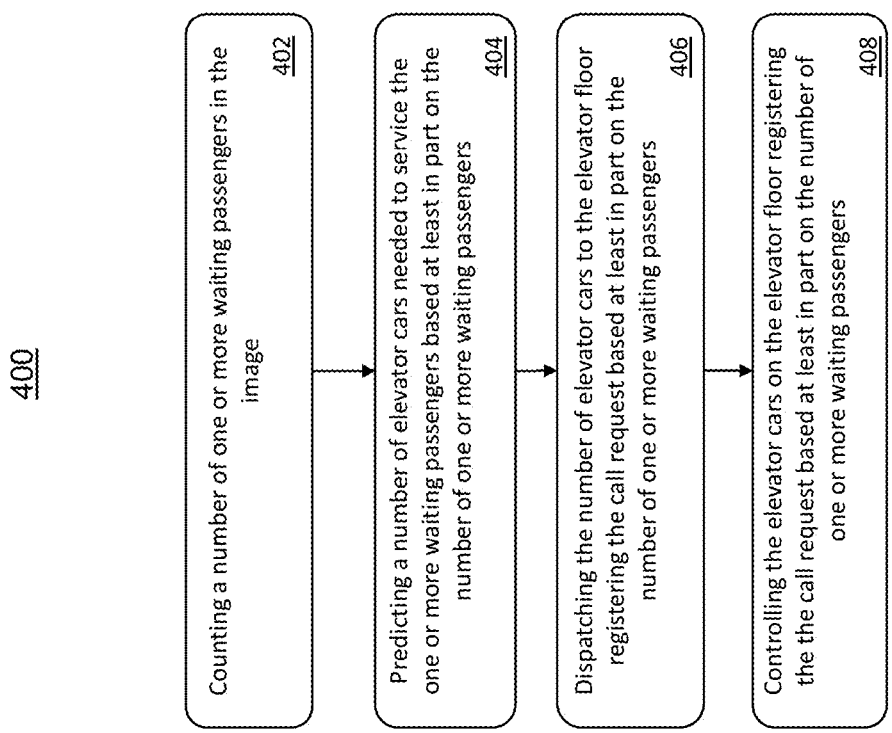
FIG. 4 depicts a flowchart of a method for dispatching multiple elevators to the elevator floor based on identifying a number of waiting passengers in accordance with one or more embodiments.

FIG. 4 depicts a flowchart of a method for dispatching multiple elevators based on the predicted number of waiting passengers. Block 402 counts a number of one or more waiting passengers in the image. In one or more embodiments, the image is processed using the machine learning and deep learning algorithms. Block 404 predicts a number of elevator cars that are needed to service the one or more waiting passengers based at least in part on the number of one or more waiting passengers.

Block 406 dispatches the number of elevator cars 204 to the elevator floor 208 registering the call request based at least in part on the number of one or more waiting passengers. In one or more embodiments, a waiting passenger threshold can be used to limit the number of passengers that enter a single elevator car 204. This can encourage social distancing among the plurality of waiting passengers. In a non-limiting example, if the waiting passenger threshold is set to 4 passengers and 5 passengers have been identified by the machine learning and deep learning algorithms in the captured image, 2 elevator cars 208 can be dispatched to the same elevator floor 208 registering the call request to service the 5 passengers.

Block 408 controls the elevator cars 204 on the elevator floor 208 registering the call request based at least in part on the number of one or more waiting passengers. In one or more embodiments, the elevators can be controlled to reduce the number of elevators if the number of waiting passengers is reduced below the waiting passenger threshold or increased if the number of waiting passengers is increased above the waiting passenger threshold. Also, if no passengers are detected the call request can be ignored and the elevator car 204 can continue to service another call request without stopping at the elevator floor 208 that registered the initial call request. The method 400 ends can return to step 302 of FIG. 3 to continue analyzing the presence of waiting passengers for subsequent call requests. It should be understood the method 400 is not intended to be limited by the steps shown in FIG. 4.

Figure 5:
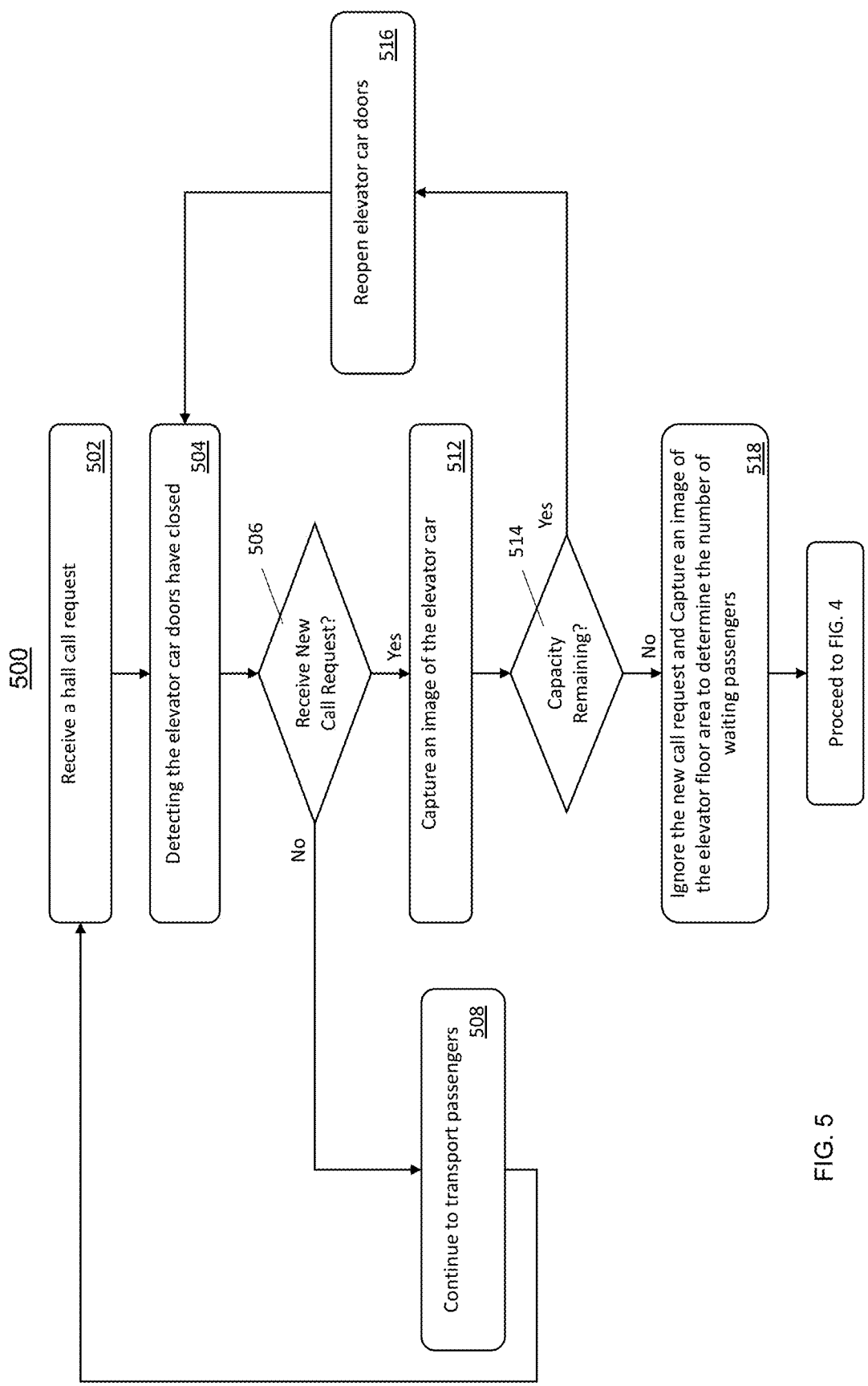
FIG. 5 depicts a flowchart of a method for avoiding hall call requests and efficiently dispatching passengers in accordance with one or more embodiments.

FIG. 5 depicts a flowchart of a method 500 for avoiding hall call requests and efficiently dispatching passengers in accordance with one or more embodiments. The method 500 begins at block 502 which provides for receiving a hall call request. The hall call request can be placed by pressing a button located in the elevator floor 208. After the arrival of the elevator car 204 at the elevator floor, one or more passengers will board the elevator car 204 and the elevator doors will be closed.

At block 504, the method 500 detects the elevator doors have closed. The doors can determined be closed using a variety of methods. For example, sensors may be located proximate to the elevator doors to transmit a signal indicating the doors have been closed to the elevator controller. In another example, a camera can be used to capture an image or video of the elevator doors to determine when the elevator doors are in the open position or the closed position. After the elevator doors are closed it is presumed that one or more waiting passengers have entered the elevator car.

At decision block 506, the method 500 determines whether a new hall call request is received. In one or more embodiments, if the new hall call request is registered at the elevator controller from the same floor prior to the elevator car 204 departing the elevator floor 208, the method 500 will proceed to block 512. If so ("Yes" branch), at block 512 an image, using a camera located inside the elevator car, of the inside of the elevator car is obtained and transmitted to an image server for analysis. At decision block 514, machine learning and deep learning processes are applied to the image to determine if the remaining capacity in the elevator car is available to accept additional passengers.

If it is determined that available capacity remains in the elevator car ("Yes" branch), the elevator doors can be re-opened (block 516) to allow the additional waiting passengers to board the elevator car. In one or more embodiments, an alert or notification can be provided to the waiting passengers on the elevator floor and passengers on the inside of the elevator car to indicate that one or more waiting passengers may enter the elevator car. After one or more waiting passengers have entered the elevator car, the elevator doors are closed and the method continues to block 504.

If at decision block 514, it is determined that no capacity remains in the elevator car ("No branch"), the method 500 proceeds to block 518 where the new hall call request is ignored and an image is captured of the elevator floor area, using a camera positioned in the elevator floor area, to determine the number of waiting passengers. The method 500 proceed to FIG. 4 to determine the number of additional elevator cars that should be dispatched to the elevator floor to service the waiting passengers.

If at decision block 506 it is determined the no new hall call request is registered ("No" branch), the method 500 continues to block 508 where the elevator car continues to transport the boarded passengers to the destination. In one or more embodiments, the method 500 continues to block 502 to repeat the process.

The technical effects and benefits include efficient utilization of call requests to allocate additional elevators based on passenger traffic detection. This allows the elevator system to serve more passengers faster and reduces passenger waiting times. In addition, by efficiently controlling passengers' traffic by allocating more elevators the passengers can maintain proper social distancing, and the allocation of elevators based on passengers traffic detection can save the power and energy of the elevator constantly stopping and restarting. In addition, unwarranted hall call requests can be avoided based on the remaining capacity in the elevator car.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
receiving, at an elevator controller, a call request from an elevator floor;
responsive to receiving the call request, capturing an image of the elevator floor registering the call request;
determining, from the image, a presence of one or more waiting passengers on the elevator floor registering the call request;
dispatching an elevator car to the elevator floor registering the call request; and
controlling the elevator car based at least in part on determining the presence of the one or more waiting passengers;
the method further comprising:
receiving a new hall call request prior to the elevator car departing the elevator floor registering the new hall request;
determining remaining capacity inside the elevator car responsive to receiving the new hall call request;
in response to the remaining capacity inside the elevator car being not available to accept additional passengers, ignoring the new hall call request;
in response to the remaining capacity inside the elevator car being available to accept additional passengers, re-opening elevator car doors to allow one or more waiting passengers to board the elevator car.

2. The method of claim 1, wherein determining the presence of one or more waiting passengers, counting a number of the one or more waiting passengers in the image;
predicting a number of elevator cars needed to service the one or more waiting passengers based at least in part on the number of one or more waiting passengers;
dispatching the number of elevator cars to the elevator floor registering the call request based at least in part on the number of the one or more waiting passengers; and
stopping the elevator cars on the elevator floor registering the call request based at least in part on the number of waiting passengers.

3. The method of claim 2, further comprising performing a subsequent image capture to determine the presence of the one or more waiting passengers.

4. The method of claim 1, further comprising performing a subsequent image capture of the elevator floor registering the call request after dispatching the one or more elevators cars, modifying the number of elevator cars that have been dispatched based at least in part on the subsequent image capture.

5. The method of claim 1, further comprising ignoring the call request if no passengers are detected on the elevator floor registering the call request.

6. The method of claim 1, wherein the subsequent image is captured after the elevator car begins traveling towards the elevator floor registering the call request.

7. The method of claim 1, wherein the image is analyzed when the elevator car is a threshold distance away from the elevator floor registering the call request.

8. The method of claim 1, wherein determining the presence of one or more passengers is based on performing machine learning on the image to individually identify the one or more passengers.

9. A system comprising:
an elevator car and elevator controller;
one or more sensors operably coupled to the elevator car and the elevator controller, wherein the one or more sensors are adapted to capture an image of an elevator floor registering a call request,
wherein the elevator controller is configured to:
receive a call request from an elevator floor;
responsive to receiving the call request, capture an image of the elevator floor registering the call request;
determine a presence of one or more waiting passengers on the elevator floor registering the call request;
dispatch an elevator car to the elevator floor registering the call request; and
control the elevator car on the elevator floor based at least in part on determining the presence of the one or more waiting passengers;
the elevator controller is further configured to:
receive a new hall call request prior to the elevator car departing the elevator floor registering the new hall request;
determine remaining capacity inside the elevator car responsive to receiving the new hall call request;
in response to the remaining capacity inside the elevator car being not available to accept additional passengers, ignore the new hall call request;
in response to the remaining capacity inside the elevator car being available to accept additional passengers, re-open elevator car doors to allow one or more waiting passengers to board the elevator car.

10. The system of claim 9, wherein the elevator car further comprises a camera located inside the elevator car that is positioned to capture an image of boarded passengers.

11. The system of claim 9, wherein determining the presence of one or more waiting passengers further comprises:
    count a number of the one or more waiting passengers in the image;
    predict a number of elevator cars needed to service the one or more waiting passengers based at least in part on the number of one or more waiting passengers;
    dispatch the number of elevator cars to the elevator floor registering the call request based at least in part on the number of the one or more waiting passengers; and
    control the elevator cars on the elevator floor registering the call request based at least in part on the number of one or more waiting passengers.

12. The system of claim 11, wherein the elevator controller is configured to perform a subsequent image capture to determine the presence of the one or more waiting passengers.

13. The system of claim 9, further comprising the elevator controller configured to perform a subsequent image capture of the elevator floor registering the call request after dispatching one or more elevators cars; and
    modify the number of elevator cars that have been dispatched based at least in part on the subsequent image capture.

14. The system of claim 9, wherein the elevator controller is further configured to ignore the call request if no passengers are detected on the elevator floor registering the call request.

15. The system of claim 9, wherein the elevator controller is configured to analyze the image responsive to receiving the call request registering the elevator floor.

16. The system of claim 9, wherein the elevator controller is configured to capture a subsequent image after the elevator car begins traveling towards the elevator floor registering the call request.

17. The system of claim 9, wherein the elevator controller is configured to analyze the image when the elevator car is a threshold distance away from the elevator floor registering the call request.

18. The system of claim 9, wherein determining the presence of one or more passengers is based on performing machine learning on the image to individually identify the one or more passengers.

19. The system of claim 9, further comprising a plurality of elevator floors, wherein the one or more sensors comprises an image capturing device at each elevator floor.

20. A method comprising:
    receiving, at an elevator controller, a call request from an elevator floor;
    responsive to receiving the call request, capturing an image of the elevator floor registering the call request;
    determining, from the image, a presence of one or more waiting passengers on the elevator floor registering the call request;
    dispatching an elevator car to the elevator floor registering the call request;
    controlling the elevator car based at least in part on determining the presence of the one or more waiting passengers;
    receiving a new hall call request prior to the elevator car departing the elevator floor registering the new hall call request;
    determining remaining capacity inside the elevator car responsive to receiving the new hall call request;
    in response to the remaining capacity inside the elevator car being not available to accept additional passengers, ignoring the new hall call request;
    in response to the remaining capacity inside the elevator car being available to accept additional passengers, re-opening elevator car doors to allow one or more waiting passengers to board the elevator car;
    wherein controlling the elevator car based at least in part on determining the presence of the one or more waiting passengers comprises:
    counting a number of the one or more waiting passengers in the image;
    predicting a number of elevator cars needed to service the one or more waiting passengers based at least in part on the number of one or more waiting passengers;
    dispatching the number of elevator cars to the elevator floor registering the call request based at least in part on the number of the one or more waiting passengers, wherein the number of the dispatched elevator cars is reduced if the number of the one or more waiting passengers is reduced below a waiting passenger threshold and the number of the dispatched elevator cars is increased if the number of the one or more waiting passengers is above the waiting passenger threshold.

* * * * *